United States Patent [19]
Wilson et al.

[11] Patent Number: 5,096,244
[45] Date of Patent: Mar. 17, 1992

[54] HOLDER FOR LASER SCANNER

[75] Inventors: William M. Wilson, Sartell; Thomas A. Mathis, Royalton, both of Minn.

[73] Assignee: Champion International Corporation, Stamford, Conn.

[21] Appl. No.: 625,535

[22] Filed: Dec. 11, 1990

[51] Int. Cl.$^5$ ................................................. B25J 1/00
[52] U.S. Cl. ..................................... 294/19.1; 294/1.1
[58] Field of Search ................ 294/1.1, 19.1, 22, 23; 56/332, 333; 222/174; 235/91 R, 462, 472, 486; 239/280–281; 248/158, 161, 176, 177, 187, 309.1, 314, 511, 682, 694; 382/59

[56] References Cited
U.S. PATENT DOCUMENTS

| | | | |
|---|---|---|---|
| 544,555 | 8/1895 | Adams | 294/22 |
| 1,047,505 | 12/1912 | Curtis | 294/22 |
| 3,229,859 | 1/1966 | Conroy et al. | 222/174 |
| 3,485,206 | 12/1969 | Smrt | 222/174 X |
| 3,856,209 | 12/1974 | Hickson | 222/174 X |
| 4,853,521 | 8/1989 | Claeys et al. | 235/472 X |

Primary Examiner—Johnny D. Cherry
Attorney, Agent, or Firm—Evelyn M. Sommer

[57] ABSTRACT

A telescopic support is provided which is used to hold a laser scanner to scan bar codes on labels on paper rolls at normally inaccessible heights. The support includes a basket for receiving the scanner, legs to stabilize the support against the paper roll during the scanning process, and a manually operative lever to activate the scanner from floor level.

6 Claims, 2 Drawing Sheets 5,096,244

HOLDER FOR LASER SCANNER

BACKGROUND OF THE INVENTION

1. Field of the Invention

This invention relates to a telescopic support, and more particularly, a telescopic support which is used to hold a laser scanner to scan bar codes on labels at normally inaccessible heights.

2. Description of the Prior Art

Paper rolls as well as other like articles of manufacture are provided with labels having a bar code for both inventory control and order fulfillment. The bar code is provided on a label applied to the roll cover at one end. When the paper rolls are stored, the label carrying the bar code used to identify the material in the roll and a stock number, for example, is located on the end of the roll at a substantial height above the storage facility floor.

Normally, the bar code is scanned by a hand held laser which can digitize the information represented by the code for quick reading. However, if the bar code is at an inaccessible height above the storage facility floor, it had been common practice to use the hand held laser to read the code by a user who stood on a ladder adjacent to the label. This was both time consuming and cause for accidents. Further, in certain instances, the roll was not even accessible to a person on a ladder, as where the rolls are stacked tangentially in a warehouse facility.

SUMMARY OF THE INVENTION

In accordance with the present invention, an extensible telescoping support for holding a laser scanner is provided enabling the user to scan and read a bar code on a large roll at a substantial height above a floor supporting the roll. The holder includes a pair of telescoping shafts adapted to be locked in a predetermined extended position by a rotatable collar at a height defined by the combined length of the telescoping shafts. Mounted on the smaller-diameter telescoping shaft is a stabilizing device having a pair of horizontal legs for supporting the extended shafts against the roll adjacent the label to be read. A basket is mounted on this shaft adjacent its top end for holding the laser scanning device. A platform is also provided between the basket and stabilizing device for mounting a spring-biased, manually operable, lever arrangement adjacent the basket. The lever arrangement includes a rope for rotating it and a substantially L-shaped cantilevered arm adapted to contact the switch on the laser scanner connected between the rope and a pair of intermediate links. When the extensible holder is positioned adjacent the bar code label, the rope connected to the lever arrangement can be pulled to activate the switch through contact with the cantilevered arm to initiate the scanning process even though the scanner is adjacent the bar code label at a substantial height above the floor of the storage facility.

BRIEF DESCRIPTION OF THE DRAWINGS

Further objects and advantages of the invention will become more apparent from the following description and claims and from the accompanying drawings, wherein:

DETAILED DESCRIPTION OF THE PREFERRED EMBODIMENT

Figure 1:
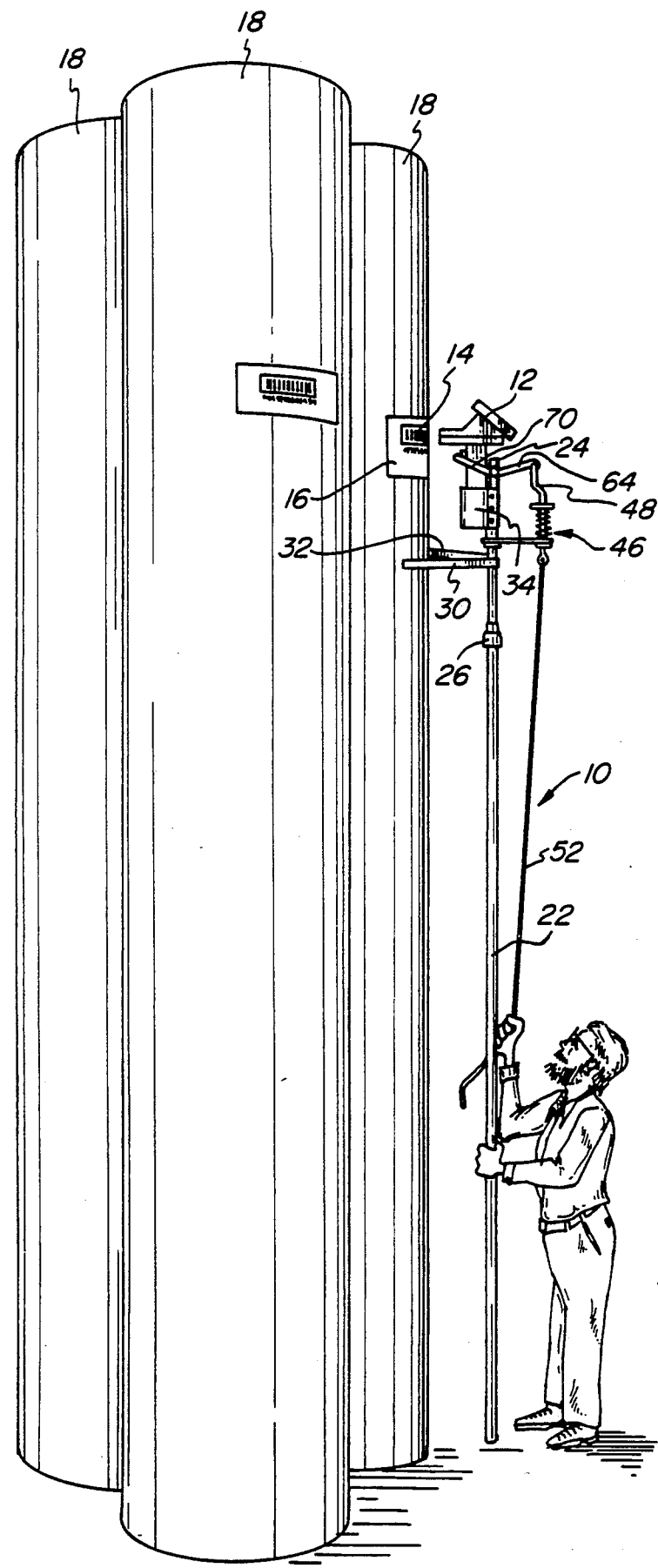
FIG. 1 is a perspective view of the support of the present invention in use to hold a laser scanner adjacent the bar code on a label on a paper roll located at a substantial height above the floor of a storage facility for the roll.

Referring now to the drawings in detail wherein like numerals indicate like elements throughout the several views, FIG. 1 illustrates the manner of use of an extensible support 10 comprising the subject of the present invention to hold a laser scanner 12 to read a bar code 14 provided on a label 16 on a large paper roll 18 at a substantial height above the floor 20 of a storage facility for the paper rolls 18.

The extensible support 10 includes a pair of telescoping shafts 22 and 24 held in relative adjusted position by a collar 26 which can be rotated between the shafts. Collar 26 comprises two portions 26a and 26b. Collar portion 26a is eccentrically mounted on the smaller-diameter shaft 24 on the top of larger-diameter shaft 22 by rotatable collar portion 26b. Collar portion 26a receives the smaller-diameter shaft 24 therethrough and can be rotated relative to the shaft by collar portion 26b to eccentrically bind to the shaft as is well-known in the art, to preclude further extension of the shaft 24 from shaft 22.

Mounted on shaft 24 by means of a circular clamp 28 are a pair of laterally extending stabilizer legs 30 and 32 integral with opposed ends of collar 28. A fastener 29 inserted through the clamp 28 can hold the clamp in fixed position on shaft 24. Legs 30 and 32 will bear against the exterior cover of roll 18 as illustrated in FIG. 1 to stabilize the support 10 in its extended position against the roll 18.

A basket 34 for receiving the laser scanner 12 is also mounted on the top end of shaft 24 by means of a clamping ring 36. The ring 36 may be inserted around the shaft 24 and fasteners 38 extending through the shaft 24 can hold the basket in fixed relation on the shaft 24.

A horizontal platform 40 is also mounted on shaft 24 between basket 34 and stabilizing legs 30,32. Platform 40 is also mounted on a ring 42 received on shaft 24 and held in fixed relation on the shaft by a fastener 44 extending through the ring and shaft. Platform 40 extends laterally outward from shaft 24 in a direction opposed to the laterally extended direction of basket 34 and legs 30,32.

A lever arrangement generally designated by the numeral 46 is mounted on platform 40. Lever arrangement 46 includes a first link or arm 48 extending through platform 40 and terminating at one end in a ring 50 mounted on arm 48. A pull rope 52 is tied and fastened to ring 50 and extends through the ring opening. A disc 54 is also affixed to arm 48 intermediate its ends above platform 40, and a coil spring 56 is provided between disc 54 and the top surface of platform 40. The end of arm 48 above platform 40 is rotatably connected through mating rings 58, 60 having a pivot pin 62 therethrough to a second arm or link 64. Arm 64 is rotatably connected to the top end of shaft 24 by a ring 66 receiving a bolt 68 therethrough rotatably connecting the ring portion 66 of second arm 64 to the top of shaft 24 and a ring 72 on one end of a third substantially L-shaped arm or link 70. Link or arm 70 is also rotatably connected by ring 72 to the top of shaft 24. Ring 72 is placed in abutment with ring 66 and also receives mounting bolt 68 therethrough. The inwardly projecting portion 74 of L-shaped third arm 70 is adapted to contact a switch 76 on laser scanner 12 and can be used to activate the laser scanner upon clockwise rotation of portion 74 of third arm 70.

Figure 2:
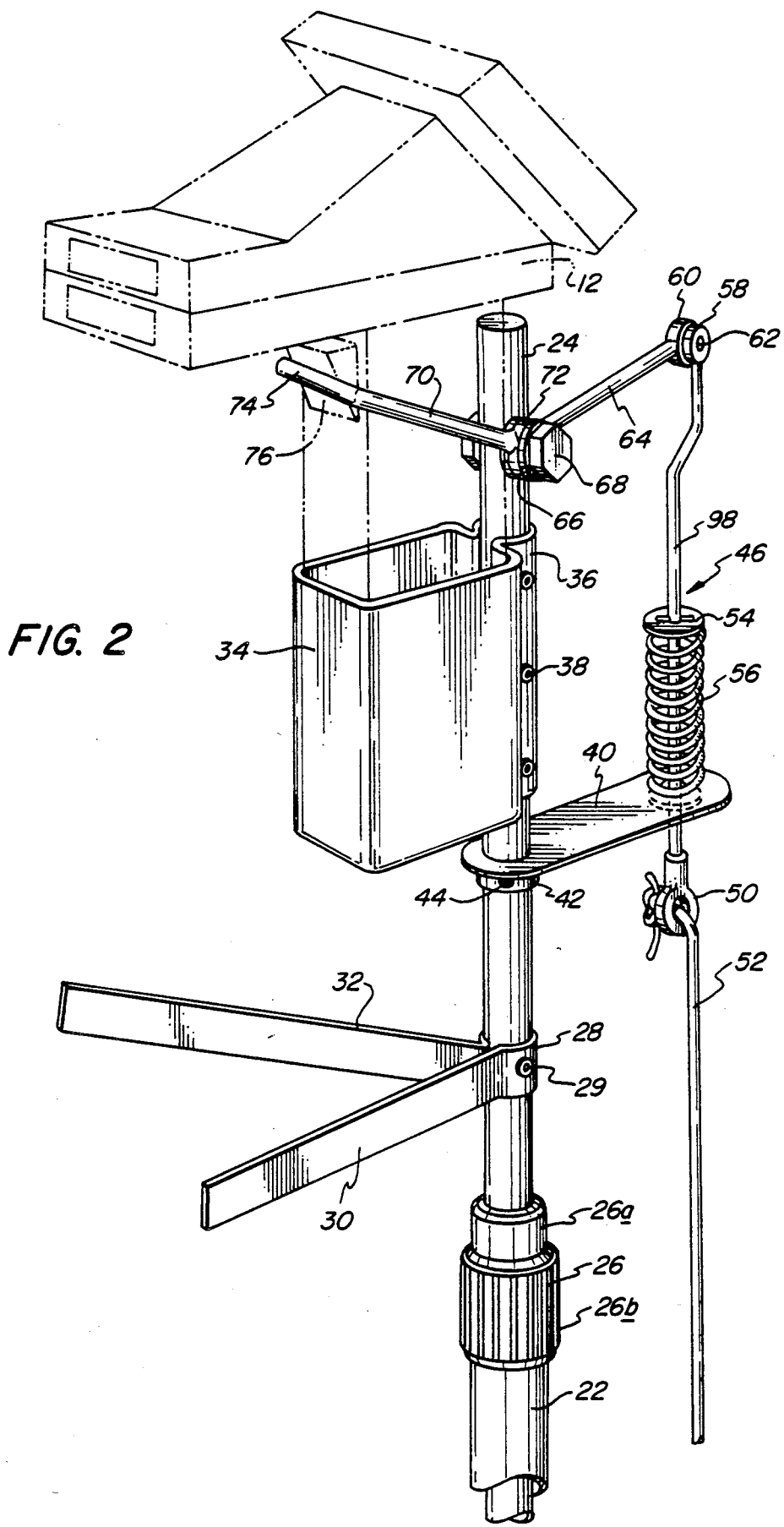
FIG. 2 is an enlarged perspective view of the upper portion of the support illustrated in FIG. 1.

As shown in FIG. 1, in use, shaft 24 is extended relative to shaft 22 so that a laser scanner 12 can be used to read the bar code 14 on a label 16 of a paper roll 18 at a considerable height above the floor 20 of a storage facility. Upon extending shaft 24 relative to shaft 22 to the desired height, collar 26 can be rotated to cause collar portion 26a to eccentrically bind and lock the relative positions of shafts 22 and 24. Laser scanner 12 is inserted within basket 34 prior to extension of shaft 24 relative to shaft 22. Once the laser scanner 12 is positioned at the desired height, legs 30 and 32 extending outwardly from shaft 24 are used to stabilize the device relative to bar code 14 on roll 18 by being positioned against the roll 18. With shaft 22 being held by the user in one hand, the rope 52 can be pulled causing downward movement of first lever arm 48 and the compression of coil spring 56 between disc 54 and the top surface of platform 40. Downward movement of arm 48 causes clockwise rotation of second arm 64 which in turn causes clockwise rotation of third arm 70 about bolt 68 on the top end of telescoping shaft 24. Clockwise rotation of arm 70 will cause clockwise rotation of third arm portion 74 to close switch 76 to activate the laser scanner to read the bar code and digitize the information on the bar code. Release of rope 52 will enable coil spring 56 to expand, returning arm 48 to its initial position, rerotating arms 64 and 70 in a counterclockwise direction, as viewed in FIG. 2, to reset the device. To deactivate the laser scanner 12, the rope 52 can again be pulled to cause switch 76 to be depressed a second time to open the circuit to the scanner.

What is claimed is:

1. An extensible support adapted to hold a laser scanner or the like for reading bar codes, said support comprising:

a pair of telescoping shafts;

means for locking said telescoping shafts in adjusted position relative to each other;

means on one of said telescoping shafts for stabilizing said support when placed against an object having a bar code to be read by a laser scanner;

means on the smaller-diameter one of said telescoping shafts for holding said laser scanner adjacent the top of said support; and lever means fixed to the smaller-diameter one of said telescoping shafts adjacent said holding means for manually activating said laser scanner to control the operation of said laser scanner placed in said holding means.

2. The support of claim 1 wherein said stabilizing means includes:

a pair of diverging legs extending laterally from said one telescoping shaft.

3. The support of claim 1 wherein said holding means includes a basket mounted on said one telescoping shaft.

4. The support of claim 1 wherein said lever means includes:

a first arm;

a second arm rotatably connected to said first arm;

said second arm having a portion adapted to contact first arm; and means for returning said first and second arm to their initial relative position upon release of said first arm.

5. The support of claim 4 wherein said return means includes:

a platform extending laterally from said smaller-diameter telescoping shaft;

a disc mounted intermediate the ends of said first arm; and a coil spring adapted to surround said first arm between said disc and platform.

6. The support of claim 5 wherein one end of said first arm includes:

a ring adapted to receive a string for initiating movement of said first arm.

* * * * *